(12) United States Patent
Hauck, Jr.

(10) Patent No.: US 11,617,363 B2
(45) Date of Patent: Apr. 4, 2023

(54) ROBOTIC AGRICULTURE PROTECTION SYSTEM

(71) Applicant: John William Hauck, Jr., Clinton, MI (US)

(72) Inventor: John William Hauck, Jr., Clinton, MI (US)

( * ) Notice: Subject to any disclaimer, the term of this patent is extended or adjusted under 35 U.S.C. 154(b) by 797 days.

(21) Appl. No.: 16/104,588

(22) Filed: Aug. 17, 2018

(65) Prior Publication Data

US 2019/0069535 A1 Mar. 7, 2019

Related U.S. Application Data

(60) Provisional application No. 62/555,113, filed on Sep. 7, 2017.

(51) Int. Cl.

| | |
|---|---|
| A01M 29/00 | (2011.01) |
| A01M 29/10 | (2011.01) |
| B25J 19/02 | (2006.01) |
| A01M 31/00 | (2006.01) |
| B25J 11/00 | (2006.01) |
| B25J 5/00 | (2006.01) |
| B25J 9/16 | (2006.01) |
| A01M 29/16 | (2011.01) |
| G05D 1/02 | (2020.01) |
| B25J 9/00 | (2006.01) |

(52) U.S. Cl.
CPC ............ *A01M 29/10* (2013.01); *A01M 29/16* (2013.01); *A01M 31/002* (2013.01); *B25J 5/005* (2013.01); *B25J 9/161* (2013.01); *B25J 11/002* (2013.01); *B25J 19/023* (2013.01); *G05D 1/02* (2013.01); *G05D 1/0246* (2013.01); *G05D 1/0291* (2013.01); *B25J 9/0003* (2013.01)

(58) Field of Classification Search
CPC .... A01M 29/10; A01M 29/16; A01M 31/002; B25J 9/161; B25J 11/002; B25J 19/023; B25J 9/0003
USPC ......................................................... 119/712
See application file for complete search history.

(56) References Cited

U.S. PATENT DOCUMENTS

| | | | |
|---|---|---|---|
| 7,052,348 B2 | 5/2006 | Price et al. | |
| 7,411,504 B2 | 8/2008 | Hanscom | |
| 7,654,217 B2 | 2/2010 | Sullivan | |
| 7,669,801 B2 | 3/2010 | Guadagna | |
| 7,854,108 B2 * | 12/2010 | Koselka .............. | A01B 51/026 56/10.2 A |

(Continued)

FOREIGN PATENT DOCUMENTS

| | | |
|---|---|---|
| CN | 000205624118 U | 5/2016 |
| GB | 000190903679 | 2/1909 |
| JP | 002011139688 A | 1/2010 |

*Primary Examiner* — Richard T Price, Jr.
(74) *Attorney, Agent, or Firm* — G+J Law Group PLLC; Georgios A. Georgakis

(57) ABSTRACT

A system useful to protect a real estate property includes at least one sensor configured to monitor presence of a nuisance animal on the real estate property, a computerized control module including programming to diagnose the presence of the nuisance animal based upon data from the at least one sensor, and at least one mobile robotic device. The mobile robotic device is configured to move to a location of the nuisance animal on the real estate property based upon the data from the at least one sensor and emulate a predator to move the nuisance animal.

19 Claims, 12 Drawing Sheets

(56) References Cited

U.S. PATENT DOCUMENTS

| | | | |
|---|---|---|---|
| 8,171,875 | B1 | 5/2012 | Caldwell et al. |
| 8,713,846 | B1 * | 5/2014 | Thrash .................. A63H 11/10 |
| | | | 43/2 |
| 10,088,841 | B2 * | 10/2018 | Kerzner ........... G08B 13/19697 |
| 10,165,722 | B2 * | 1/2019 | Ackerman ................ G01S 5/16 |
| 10,642,264 | B2 * | 5/2020 | Sentosa ................ G08G 5/0013 |
| 10,698,402 | B2 * | 6/2020 | Kosa .................... A01B 69/004 |
| 10,930,129 | B2 * | 2/2021 | Noras .................. G05D 1/0022 |
| 10,932,450 | B2 * | 3/2021 | Tippery ............... A01K 11/008 |
| 11,019,805 | B2 * | 6/2021 | Hartung ............... G05D 1/0272 |
| 2005/0071046 | A1 | 3/2005 | Miyazaki et al. |
| 2007/0163516 | A1 | 7/2007 | D'Andrea |
| 2015/0205298 | A1 * | 7/2015 | Stoschek ................ B60L 50/60 |
| | | | 701/23 |

* cited by examiner

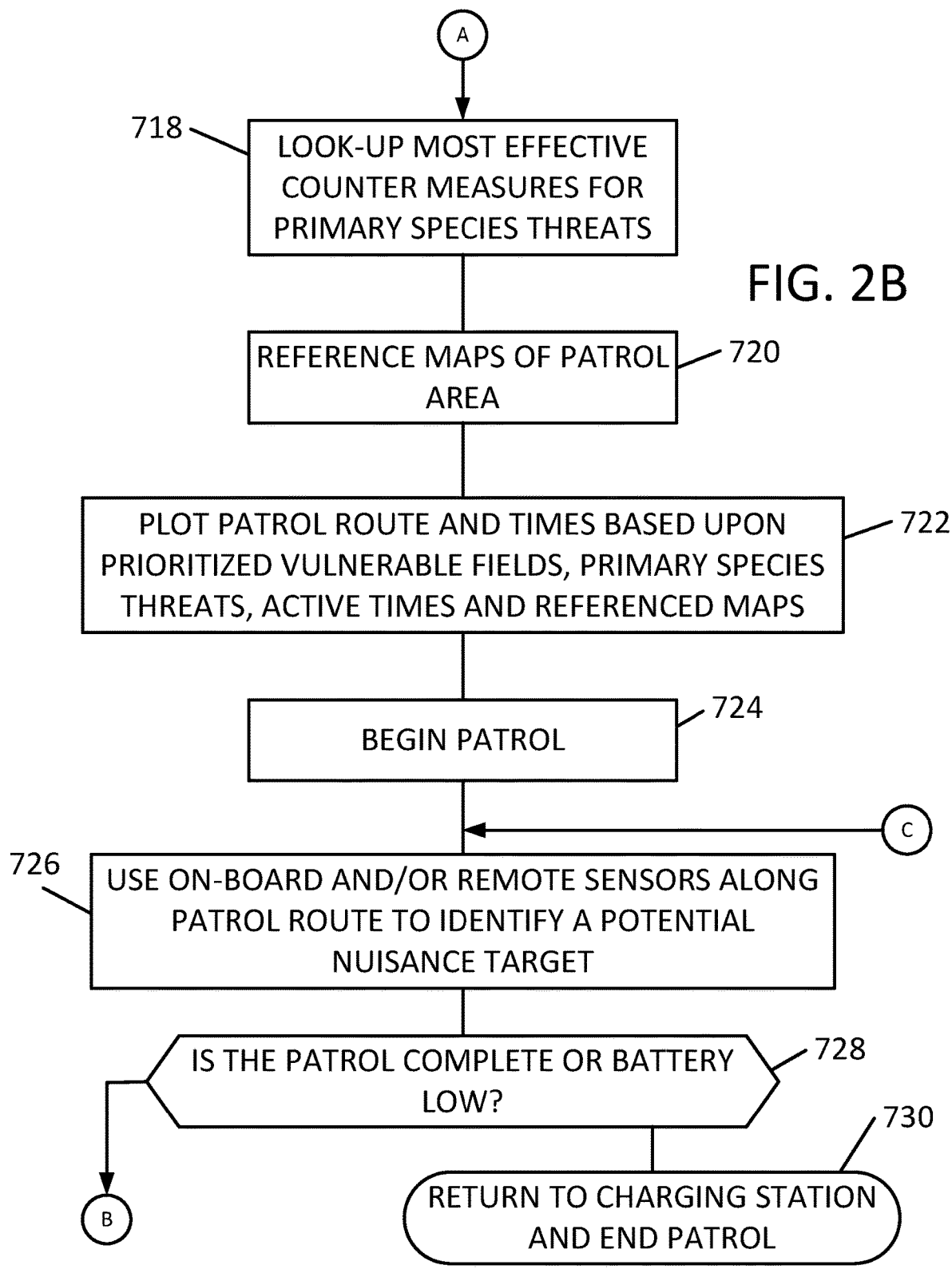

ROBOTIC AGRICULTURE PROTECTION SYSTEM

CROSS-REFERENCE TO RELATED APPLICATIONS

This disclosure claims priority to U.S. Provisional Patent Application 62/555,113 filed on Sept. 7, 2017, which is hereby incorporated by reference.

TECHNICAL FIELD

This disclosure is related to an automated robotic system, in particular, to a robotic system configured to protect decorative or high value landscapes, golf courses, crops and/or livestock from nuisance animals and aircraft from bird strikes.

BACKGROUND

The statements in this section merely provide background information related to the present disclosure. Accordingly, such statements are not intended to constitute an admission of prior art.

Animals can cause significant damage to gardens, crops, vineyards, and other agricultural produce on a portion of a real estate property. Raccoon can steal tomatoes. Deer can feed upon corn crops. Rabbits eat lettuce. Birds feed upon grapes. One bird eating a grape is not a significant event. A thousand birds in a vineyard can devastate a harvest in an afternoon.

Scarecrows, owl statues, and other mechanisms are known in the art for invoking a fleeing response in animals that would cause the animals to leave a field of produce alone. Motorized stationary scarecrows or owl figurines are known to increase the likelihood that the fleeing response will be invoked.

Prior devices have included stationary devices that would emit sounds (ultrasonic, distress, etc.) and some would add a predator effigy. Other devices added moving features (i.e. moving heads, flapping wings, objects that would suspend/rotate around a pole or swim around a pond, run along/around a track, etc.) These devices would either remain stationary (i.e. point "A"), run along a tether between points "A" and "B" (i.e. the X-axis), or run along a track/tether where they would move between points "A", "B", "C", etc. on the same plane.

SUMMARY

A system useful to protect a real estate property includes at least one sensor configured to monitor presence of a nuisance animal on the real estate property, a computerized control module including programming to diagnose the presence of the nuisance animal based upon data from the at least one sensor, and at least one mobile robotic device. The mobile robotic device is configured to move to a location of the nuisance animal on the real estate property based upon the data from the at least one sensor and emulate a predator to move the nuisance animal.

BRIEF DESCRIPTION OF THE DRAWINGS

One or more embodiments will now be described, by way of example, with reference to the accompanying drawings, in which:

FIGS. 2A-2D illustrate through a flow chart an exemplary process to control a mobile animal scaring robotic unit, in accordance with the present disclosure;

DETAILED DESCRIPTION

Figure 1:
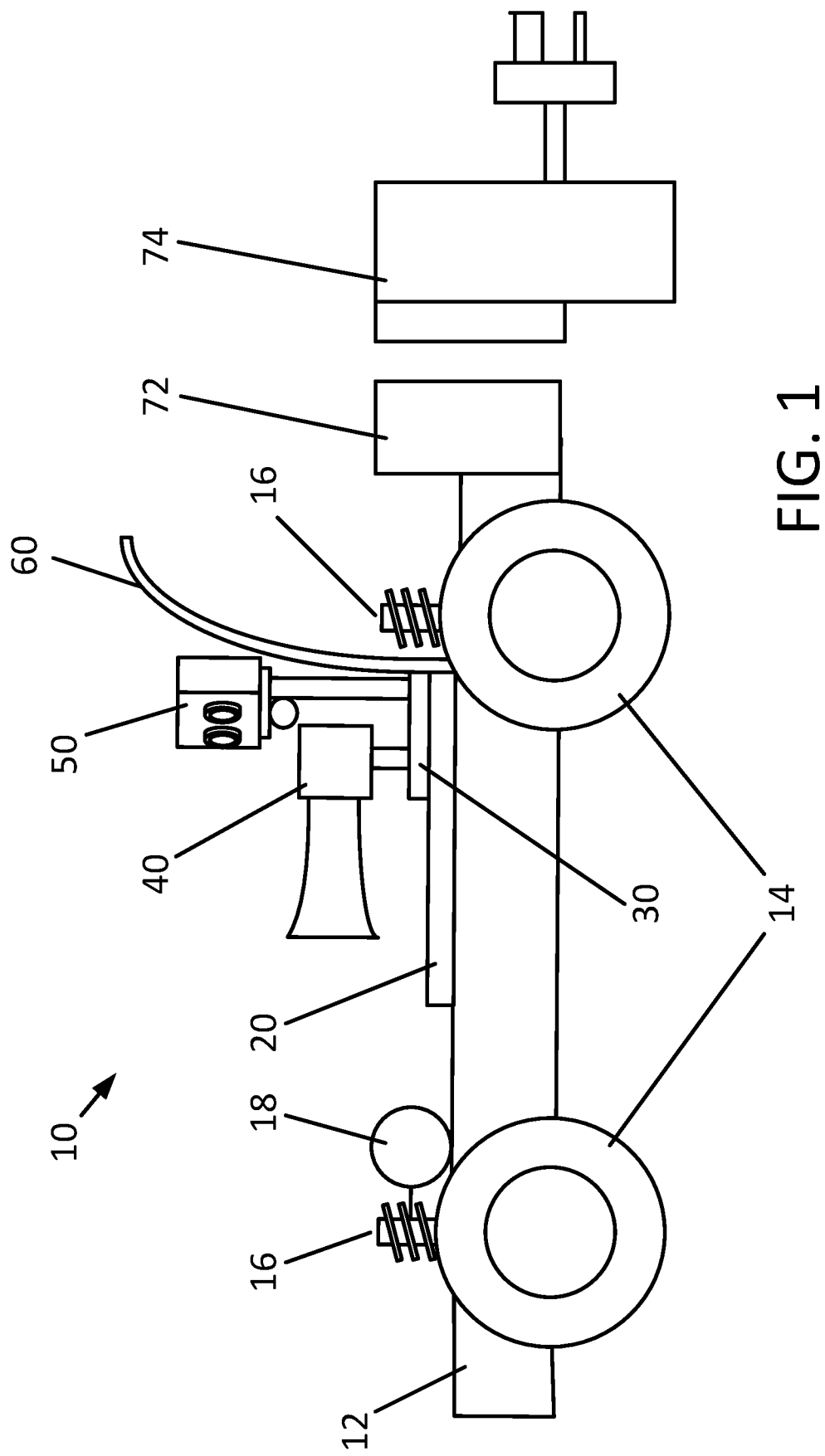
FIG. 1 illustrates an exemplary mobile animal scaring robotic system, including an autonomous mobile animal scaring robotic unit with an exemplary speaker system and camera detection system, in accordance with the present disclosure.
Figure 2A:
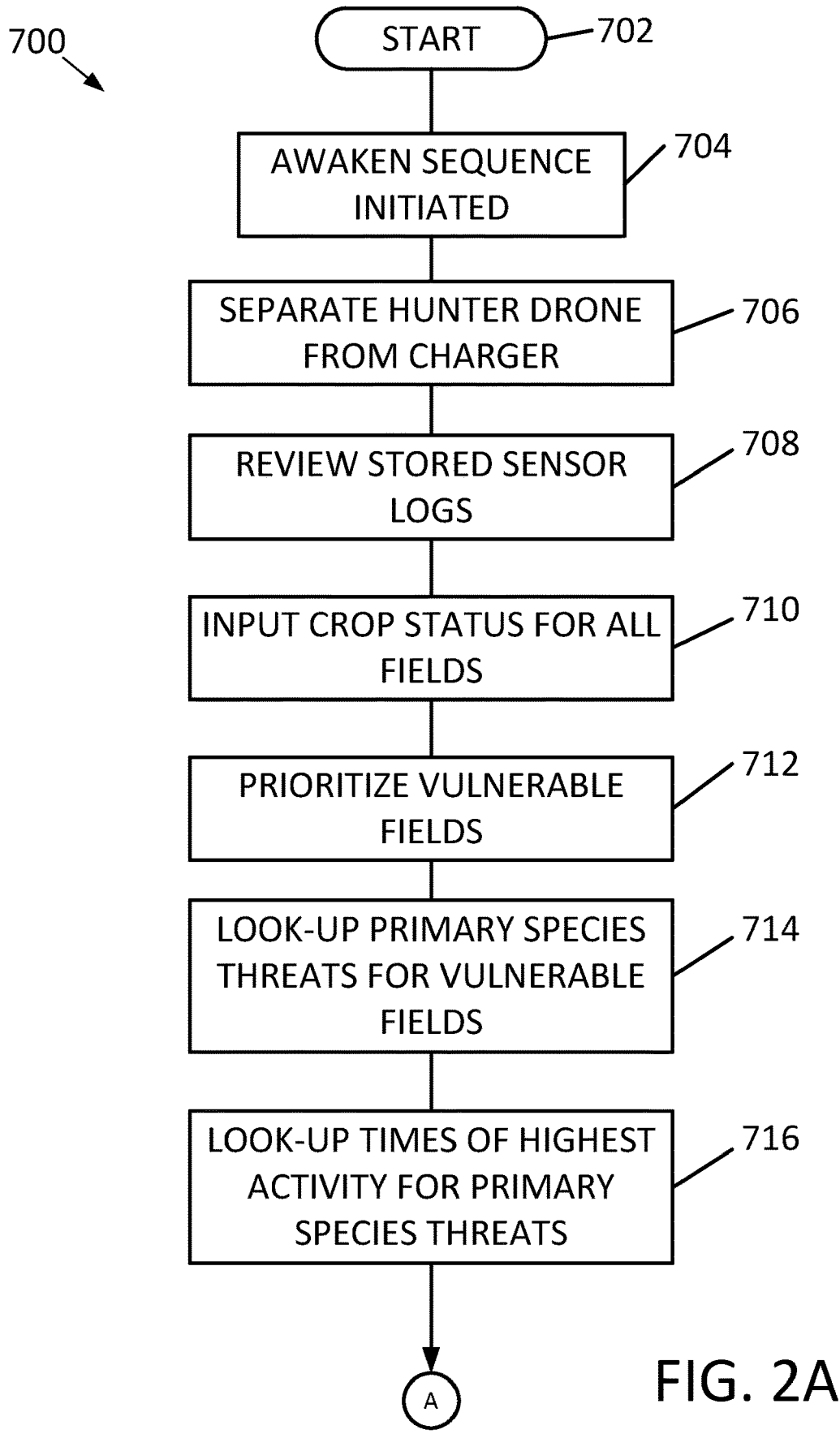
Figure 2C:
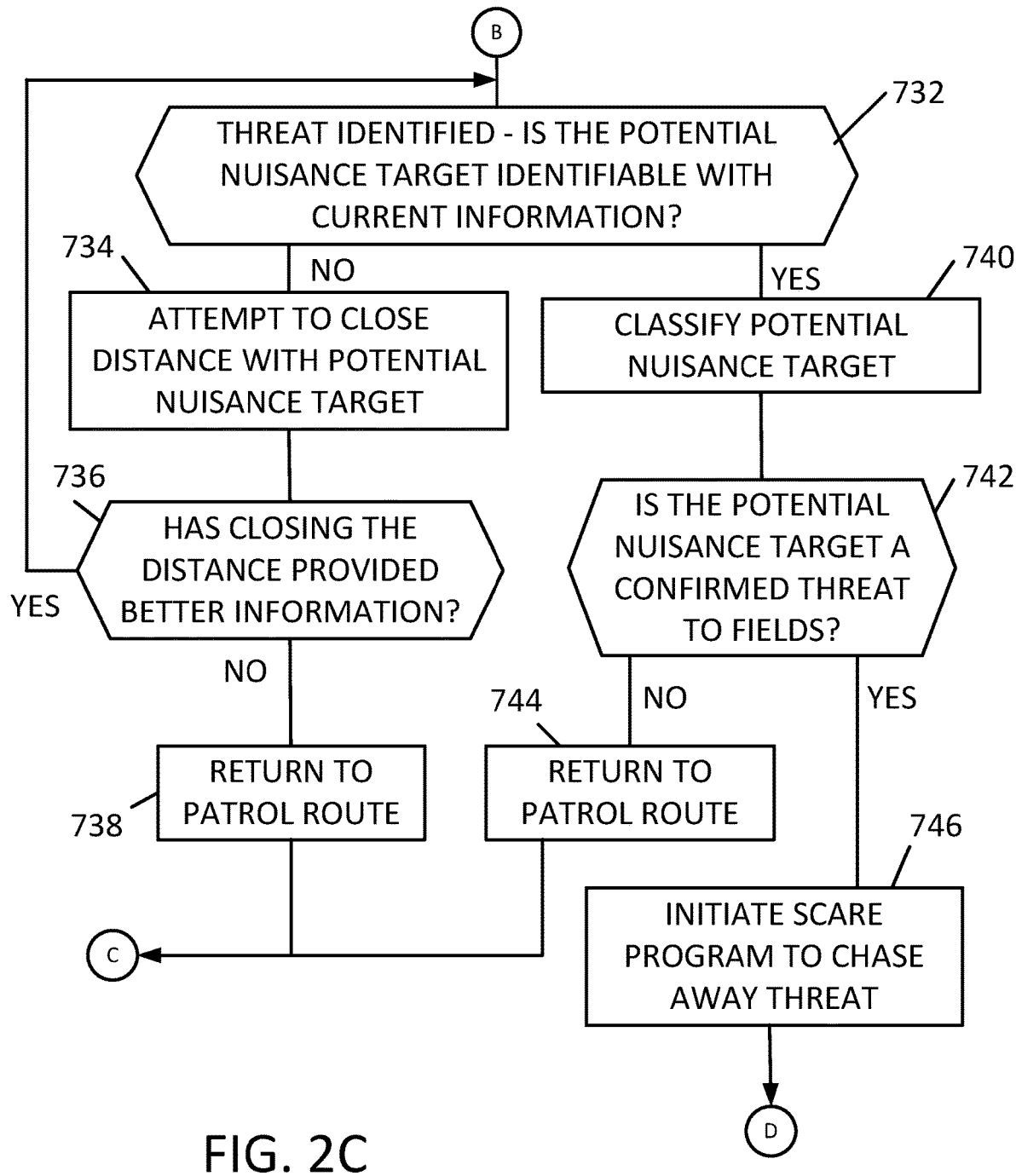
Figure 2D:
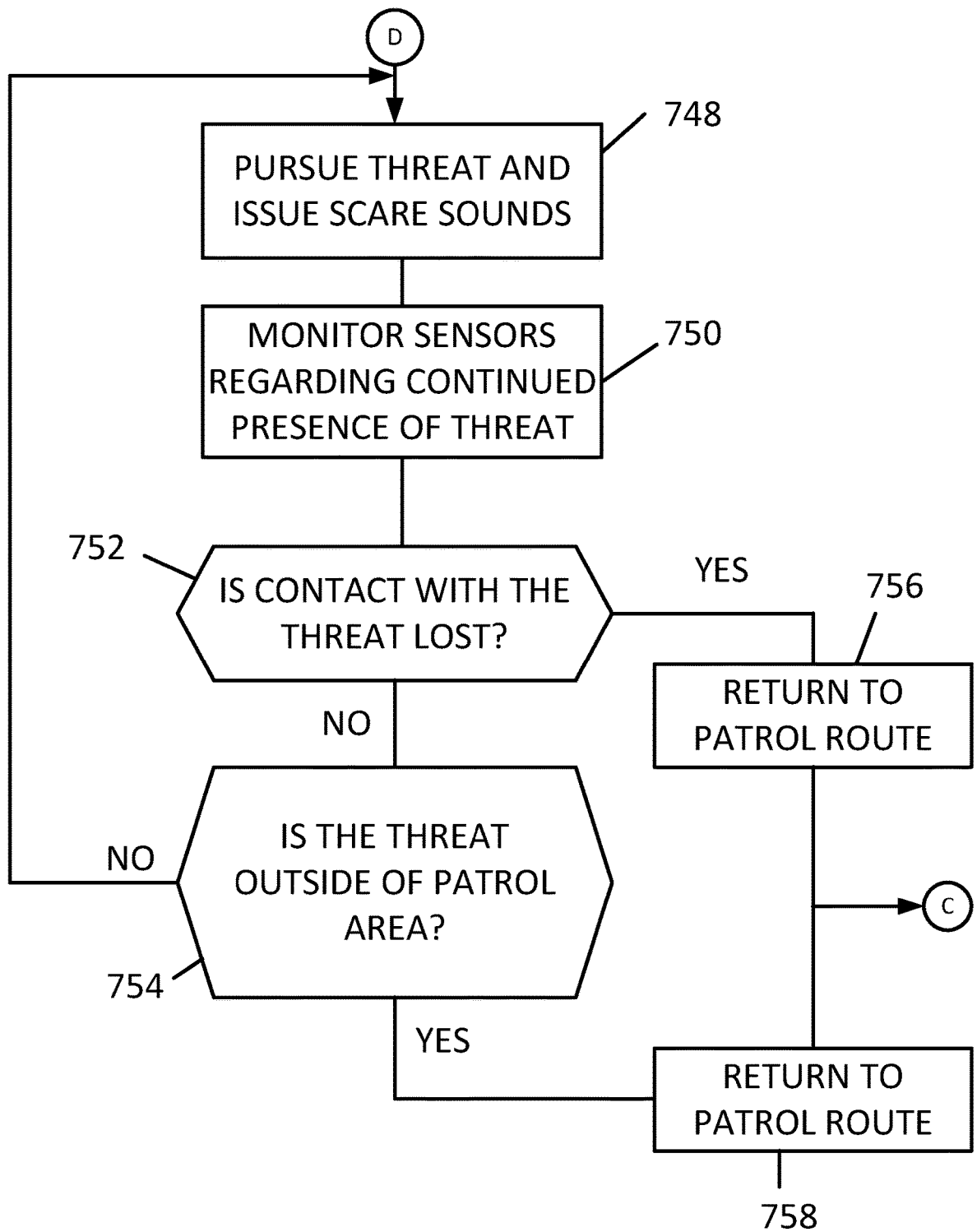

An exemplary mobile animal scaring robotic system is configured to harass and drive away nuisance animals before they inflict property damage. The system can include one or more mobile animal scaring robotic units, each separately mobile and able to transit around a patrol area for the purpose of scaring away nuisance animals from the patrol area. A mobile animal scaring robotic unit can include visual and/or auditory scheme for scaring away nuisance animals. A mobile animal scaring robotic unit can be configured generally toward all nuisance animals, or a mobile animal scaring robotic unit can be configured to scare specific animals or classes of animals. The mobile animal scaring robotic system can include a single unit that is self contained, including within it all sensors and computing resources necessary to operate. In the alternative, the mobile animal scaring robotic system can include a plurality of mobile animal scaring robotic units with distributed sensor and/or computing resources. In one embodiment, a remote base unit can be utilized with a computerized device monitoring sensor information, monitoring on-line data available from the Internet, and providing guidance information to the mobile animal scaring robotic units.

The devices utilize various forms of detection that can include but are not limited to radar, optical/image recognition, audio detection, weather sensors, moon phase sensors, motion detection, laser detection and thermal imaging. Detection signals can be transmitted to a base unit. The base unit can synthesize available sensor information to diagnose or estimate type and quantity of nuisance animals in an area.

A decision can then be made whether to direct mobile animal scaring robotic units to the area with the nuisance animals. Mobile animal scaring robotic units can include autonomous terrestrial all-terrain robot or an autonomous aerial drone that will mimic a natural predator with sound, image, and motion characteristics. The base unit will employ GPS to engage/intercept the target/intruder at coordinates provided by the remote sensor transmission. The base unit may employ sensors that provide an intercept/chase function to drive the nuisance animal(s) from a prescribed area.

The base unit can operate in many modes including: standby mode—awaiting instructions from a sensor or operator; patrol mode—the base unit moves to designated (i.e. preprogrammed) waypoints while emitting the sounds and features of a natural predator; and intercept mode, a sensor provides coordinates for the base unit to investigate. Additionally, a hunt mode can be activated where a mobile animal scaring robotic unit moves slowly around the patrol area, using both visual and auditory sensor inputs to search for potential nuisance animals.

The system can utilize a number of processes to invoke the fleeing response from an animal or group of animals. First, through image recognition or other means, the identity of the intruder can be determined. Based upon the identity of the intruder, a different sound can be emitted by the responding robotic device. For example, a murder (i.e. a flock) of crows may respond by fleeing from the sound of an eagle or a hawk, whereas such crows would be unaffected by a sound of a coyote yipping or the sound of a pack of hound dogs. By contrast, a deer might be unaffected by the sound of an eagle or a hawk, whereas a coyote or hound dog sound may cause the deer to flee.

Sounds can be emitted only by the robotic device. In another embodiment, an auxiliary speaker or set of speakers arrayed about the field or fields can be used to make the predatory sound louder or be sounded in sequence to make the predator sound as if it is getting closer. Sirens, Long Range Acoustic Devices (LRAD), or other similar sound generating devices can similarly be utilized A robot device can further be configured to look like a particular predator. A flying drone can include virtual wings to look like an owl in flight. Such a drone can also include strobing lights and a directable laser device pointer to augment a startle response in the animal with less traditional means. Sirens, Long Range Acoustic Devices (LRAD), or other similar sound generating devices can similarly be utilized. A ground based robotic device can include an outer covering to look like a dog or a mountain lion. Such a ground based robot could include a reversible or deployable outer covering that could be selected from colors imitating a dog, to a coyote, to a person.

A central unit can be used to coordinate responses over a large area. For example, a group of vineyards could pay together for a long range drone system that is programmed to cover 100 square miles or more. Sensor inputs from each of the vineyards could be coordinated to influence the pattern that the drone would fly. Another program could monitor sensor inputs, and in order to save drone battery, could deploy a drone only based upon a threshold incursion, for example, only to a flock of birds rather than to a single bird. A server could be used to coordinate responses over a larger region, for example, with farmers subscribing to a service, which would look for patterns in animal pests and could coordinate multiple drones with sounds and images that were proven to work in the region or by herding deer from multiple properties into an untended area without crops.

Ground based robotic units can be varying sizes, with non-limiting examples ranging from small unit approximately one foot long to quad runner sized vehicle equipped with automated control. One unit tested is based upon a Traxis® 4×4 model that operates typically at speeds of up to 50 miles per hour.

Nuisance animals can follow predictable tendencies. For example, feeding times can be tracked or predicted. Mechanisms using processes such as machine learning algorithms could be used to predict future animal behavior. Weather, including temperature and barometric readings, and seasonal patterns can be used in predictions. Similarly, solunar effects can be useful in predicting animal behavior. Mating seasons in animals cause changes in behavior. The disclosed systems can use any of these effects in predicting animal behavior.

Referring now to the drawings, wherein the showings are for the purpose of illustrating certain exemplary embodiments only and not for the purpose of limiting the same, FIG. 1 illustrates an exemplary mobile animal scaring robotic system, including an autonomous mobile animal scaring robotic unit with an exemplary speaker system and camera detection system. The robotic unit is embodied as an autonomous hunter drone, including on-board sensors and computing resources necessary for the unit to work autonomously. Hunter drone 10 is illustrated including chassis 12, wheels 14, battery pack and motor unit 20, noise generating device 40, camera sensor device 50, and charging station 74. Hunter drone 10 is one example of a mobile robotic device configured to move to a location of a nuisance animal and move the nuisance animal by emulating a predator. Hunter drone 10 is provided as a non-limiting example of a ground based drone configured to travel around a patrol route and use sensor data to diagnose a presence of a nuisance target animal. Once a nuisance target animal is diagnosed as being present, hunter drone 10 pursues the nuisance target animal and attempts to scare the nuisance target animal out of the patrol area by generating a loud noise with noise generating device 40. Computerized control module 30 is illustrated including computerized circuitry configured to execute programmed coded commands stored in memory. Control module 30 is in communication with control hardware for hunter drone 10, noise generating device 40, and camera sensor device 50. Antenna 60 provides communication for control module 30 with remote systems, such as communication with charging station 74 or enabling sending of a help needed signal if the unit is incapacitated by such an event as flipping over.

Chassis 12 includes suspension components 16 configured to assist stabilize hunter drone 10 while it moves around. Battery pack and motor unit 20 includes a motor for providing motive force to wheels 14. Steering motor 18 is provided for moving wheels to steer hunter drone 10. Charging port 72 includes contacts for electrically connecting with charging station 74 and receiving electrical power therefrom. The electrical connection between port 72 and station 74 can be mechanical, for example, with a metallic three pronged plug providing for power connection, or the electrical connection can be made through induction, with wireless charging occurring between port 72 and station 74.

Camera sensor device 50 can include monocular or binocular camera devices. Camera sensor device 50 can include one or more fixed camera devices, can include a camera device configured to rotate on a horizontal axis, or can include a camera device set on a multi-axis gimbal to enable the camera device to look up, down, left, or right.

Computerized control module 30 is illustrated including computerized circuitry configured to execute programmed coded commands stored in memory. Control module 30 includes a computerized processor, durable memory storage, and random access memory, such that control module 30 operates such as computerized devices known in the art capable of storing and executing programmed code. The processes disclosed herein can be operated within control module 30. In the alternative, a portion of the processes disclosed herein can be operated within control module 30, and a remaining portion of the processes can be operated within a remote computerized system such as a base station computer or a remote server device operating code in support of operation of hunter drone 10.

Hunter drone 10 is provided as one exemplary embodiment of a exemplary mobile animal scaring robotic unit in accordance with the present disclosure. A number of alternatives, both expressly described herein and not expressly disclosed herein, are envisioned, and the disclosure is not intended to be limited to the particular examples provided herein. Hunter drone 10 is illustrated with four wheels. Hunter drone 10 can have two-wheel or four-wheel drive. Hunter drone 10 can have three, six, or eight wheels. Hunter drone 10 can in one embodiment be a modified version of an all-terrain vehicle originally intended for human use. Hunter drone 10 can include battery/electric power, gasoline or diesel fuel power, propane or natural gas power, solar power, hydrogen power cells, other known power supply sources, or any combination thereof. Hunter drone 10 can have many different variations, and the disclosure is not intended to be limited to the examples provided herein.

FIGS. 2A-2D illustrate through a flow chart an exemplary process to control a mobile animal scaring robotic unit. Process 700 starts at step 702. At step 704, an exemplary awaken sequence is initiated. Such an awaken sequence can be the result many different stimuli, including but not limited to a particular time of day, light made apparent by a sunrise, as a result of sensor data indicating that a nuisance animal is present, or completion of a battery charging event. At step 706, the hunter drone separates from the charging station. At step 708, an automated review of sensor logs is conducted. At step 710, a status for fields within a designated patrol area is reviewed to determine which fields are vulnerable to intrusion by nuisance animals. At step 712, a determination is made how to prioritize fields based upon the vulnerabilities of crops and animals in the various fields. At step 714, a reference table is accessed to determine which species of nuisance animals pose greatest threats for the vulnerable fields and designate these as primary species threats. At step 716, another reference table is accessed to determine behaviors for the primary nuisance threats, including times of highest activity and likely inactivity. At step 718, another reference table is accessed to determine most effective counter measures for the primary nuisance threats. In one embodiment, another step can be included to automatically change components on the hunter drone based upon the determined most effective counter measures. At step 720, reference maps of the patrol area are accessed. At step 722, a patrol route is automatically plotted and patrol route timing is determined based upon prioritized vulnerable fields, primary species threats, active times, and referenced maps.

At step 724, a patrol is initiated and the hunter drone begins moving through the patrol area. At step 726, the hunter drone monitors on-board and/or remote sensors along the patrol route to attempt to identify potential nuisance targets. At step 728, a determination is made whether the patrol route is complete or whether the battery for the hunter drone is too low to continue on the patrol. If the patrol is complete or the battery is too low, at step 730, the hunter drone returns to the charging station and ends the patrol. If the patrol is not complete and the battery maintains sufficient charge to continue, the patrol continues until a threat is identified.

At step 732, a threat is identified, and a determination is made whether the potential nuisance target is identifiable as a particular species or class of species with information currently available. If the target is not currently identifiable, the process advances to step 734, where the hunter drone attempts to close distance with the potential nuisance threat. At step 736, a determination is made whether attempting to close the distance has provided better information about the potential nuisance threat. If closing the distance has provided better information, the process returns to step 732 where the determination of whether the potential target can be identified is repeated. If attempting to close the distance has not provided better information, the process advances to step 738 where the hunter drone returns to the patrol route. If the potential target in step 732 can be identified, the process advances to step 740 where the potential nuisance target is classified by species or group of species. At step 742 a determination is made whether the potential nuisance target is a confirmed threat to the fields within the patrol area. If the potential nuisance target is determined to not be a threat to the fields, the hunter drone returns to patrol route. If the potential nuisance target is determined to be a threat to the fields, the hunter drone at step 746 initiates a scare program to chase away the potential nuisance threat.

Upon initiation of a scare program at step 746, the exemplary hunter drone at step 748 pursues the threat and issues scare sounds selected to scare the potential nuisance threat. A particular scare sound or sounds can be selected based upon the determined species of group of species to which the potential nuisance target belongs. For example, a group of crows can be scared away with the sound of a hawk screeching. In another example, a deer can be scared away by the sounds of coyotes hunting nearby. In another example, a raccoon can be scared away by the sounds of baying dogs. At step 750, sensors are monitored to examine whether the threat is still present or if it has vacated the area. At step 752, a determination is made whether contact with the potential nuisance threat has been lost. If the contact has been lost, at step 756, the drone returns to the patrol route. If contact has not been lost, a determination is made at step 754 whether the threat has likely moved outside of the patrol area. If the threat has likely moved out of the patrol area, the process advances to step 758 where the drone returns to the patrol route. If the threat is determined to have likely remained in the patrol area, the process returns to step 748 where the pursuit continues. Process 700 is exemplary, a number of alternative steps are envisioned and enabled by the disclosure, and the disclosure is not intended to be limited to the particular examples provided herein.

Figure 3:
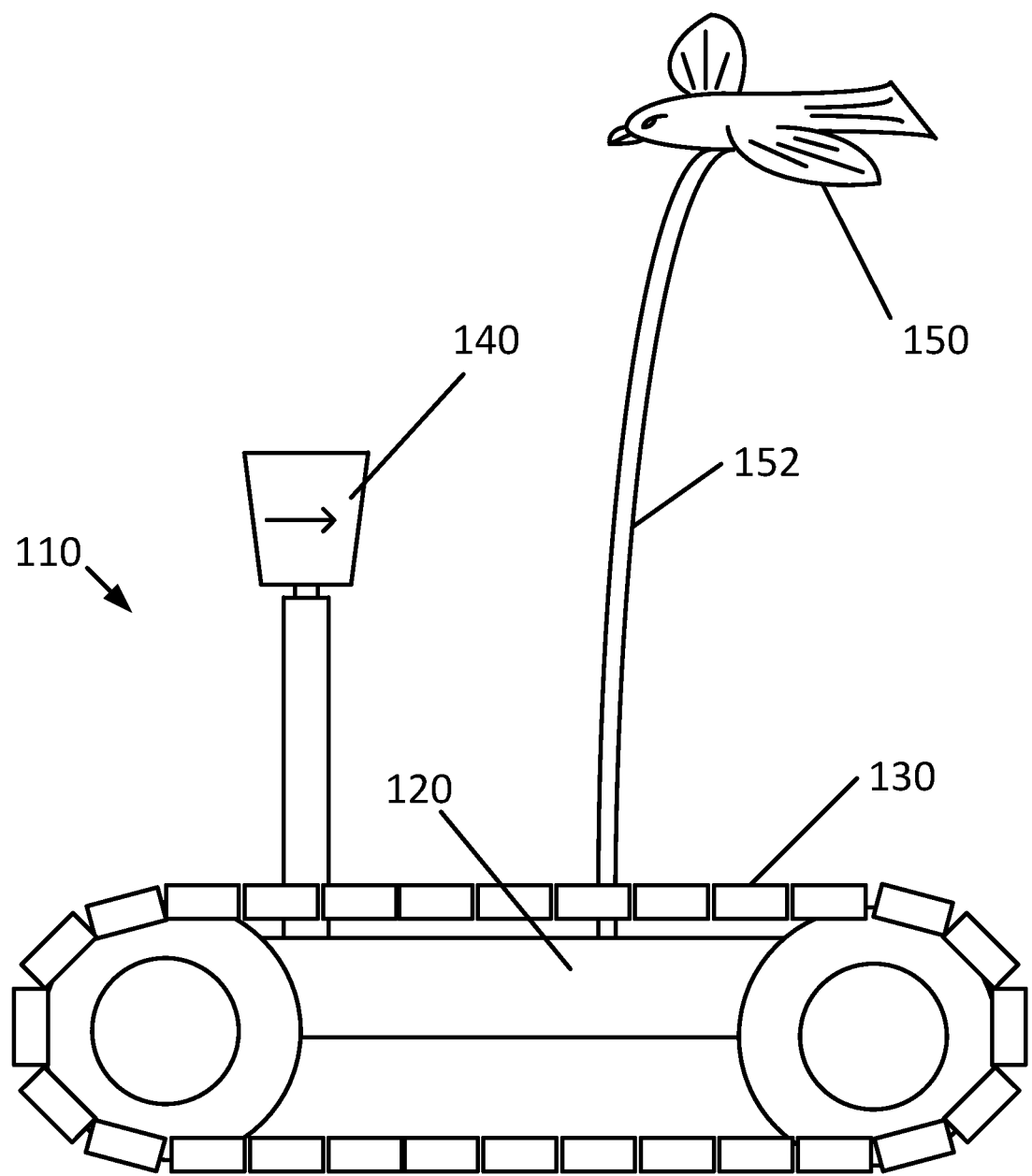
FIG. 3 illustrates an alternative exemplary mobile animal scaring robotic unit, including a caterpillar track, a LIDAR sensor, and a bird effigy, in accordance with the present disclosure.

FIG. 3 illustrates an alternative exemplary mobile animal scaring robotic unit, including a caterpillar track, a LIDAR sensor, and a bird effigy. Robotic unit 110 is illustrated including chassis 120, caterpillar track 130, rotating LIDAR sensor system 140, and bird effigy 150 simulating a hawk or similar predator. Tether 152 is illustrated connecting bird effigy 150 to chassis 120. Caterpillar track 130 can be advantageous over rough terrain as compared to wheels. Rotating LIDAR sensor system 140 includes a LIDAR device known in the art, for example, in autonomous automotive applications, where the sensor and associated computerized resources map out a three dimensional contour of an environment surrounding the LIDAR device. Bird effigy 150 can be a simple wire construction with exemplary nylon material stretched over the wires to look like a bird. In other examples, bird effigy 150 can be a semi-independent tethered device, for example, configured to motor around a radius around chassis 120 or to elevate and lower relative to chassis 120.

It will be appreciated that a battery, motor, and control module similar to the components of the unit of FIG. 1 are similarly included on the unit of FIG. 3 and all ground-based robotic units within the disclosure.

Figure 4:
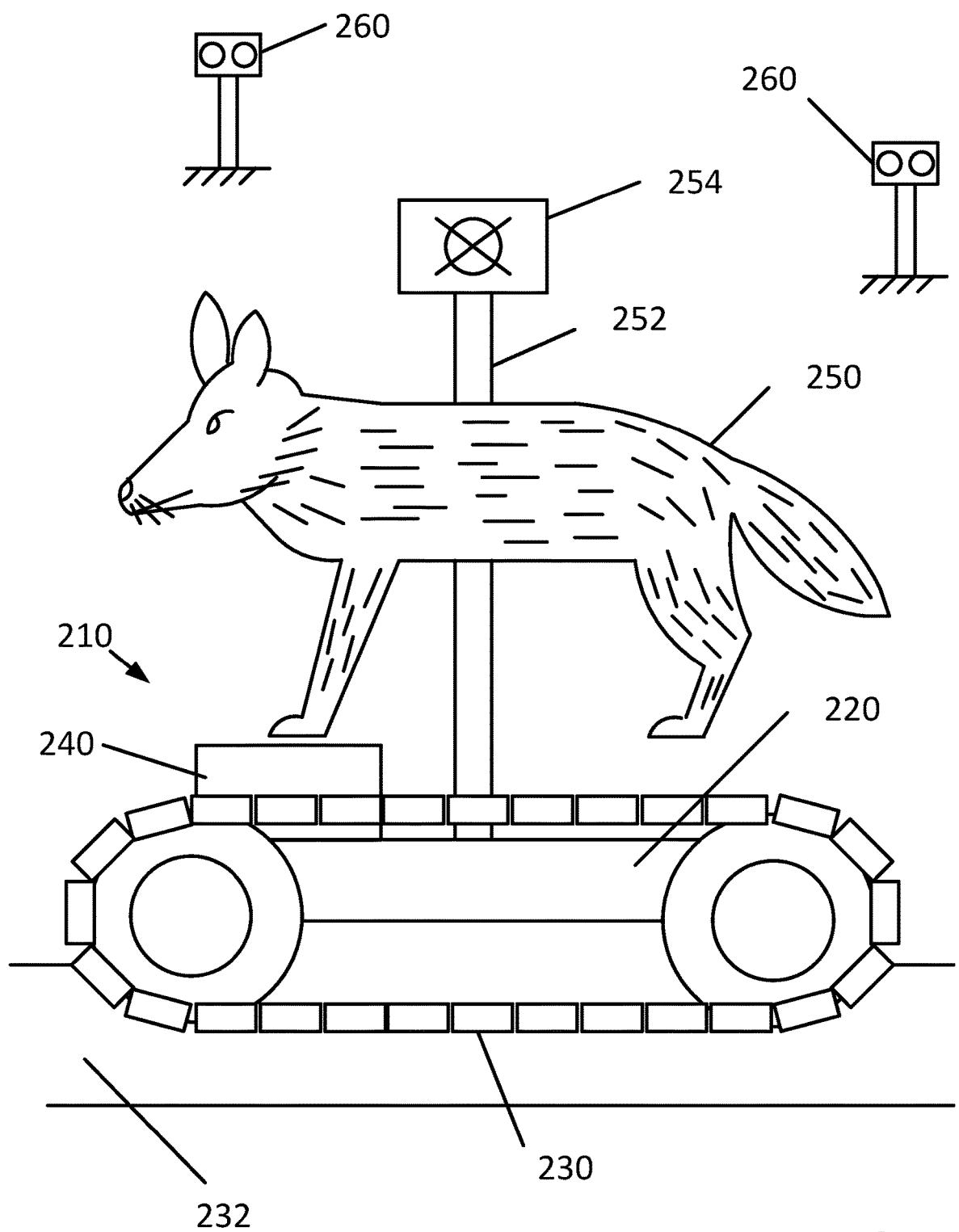
FIG. 4 illustrates an alternative exemplary mobile animal scaring robotic unit, including a caterpillar track, a visual token providing for remote control of the unit, and a coyote effigy, in accordance with the present disclosure.

FIG. 4 illustrates an alternative exemplary mobile animal scaring robotic unit, including a caterpillar track, a visual token providing for remote control of the unit, and a coyote effigy. Robotic unit 210 is illustrated upon path 232. Robotic unit 210 is illustrated including chassis 220, caterpillar tracks 230, computerized control unit 240, coyote effigy 250 attached to pole 252, and visual token 254 also attached to pole 252. Two remote camera devices 260 are illustrated within view of unit 210. Visual token 254 includes a unique and easily identifiable pattern which camera device 260 can track. By using data from camera devices 260, along with known locations of camera devices 260, computerized control unit 240 can determine a location and orientation of robotic unit 210 and control movement of robotic unit 210 accordingly. Additionally or alternatively, global positioning data, cellular tower data, and inertial data such as can be determined through use of gyroscopic hardware can be used to determine a location and orientation of robotic unit 210.

Figure 5:
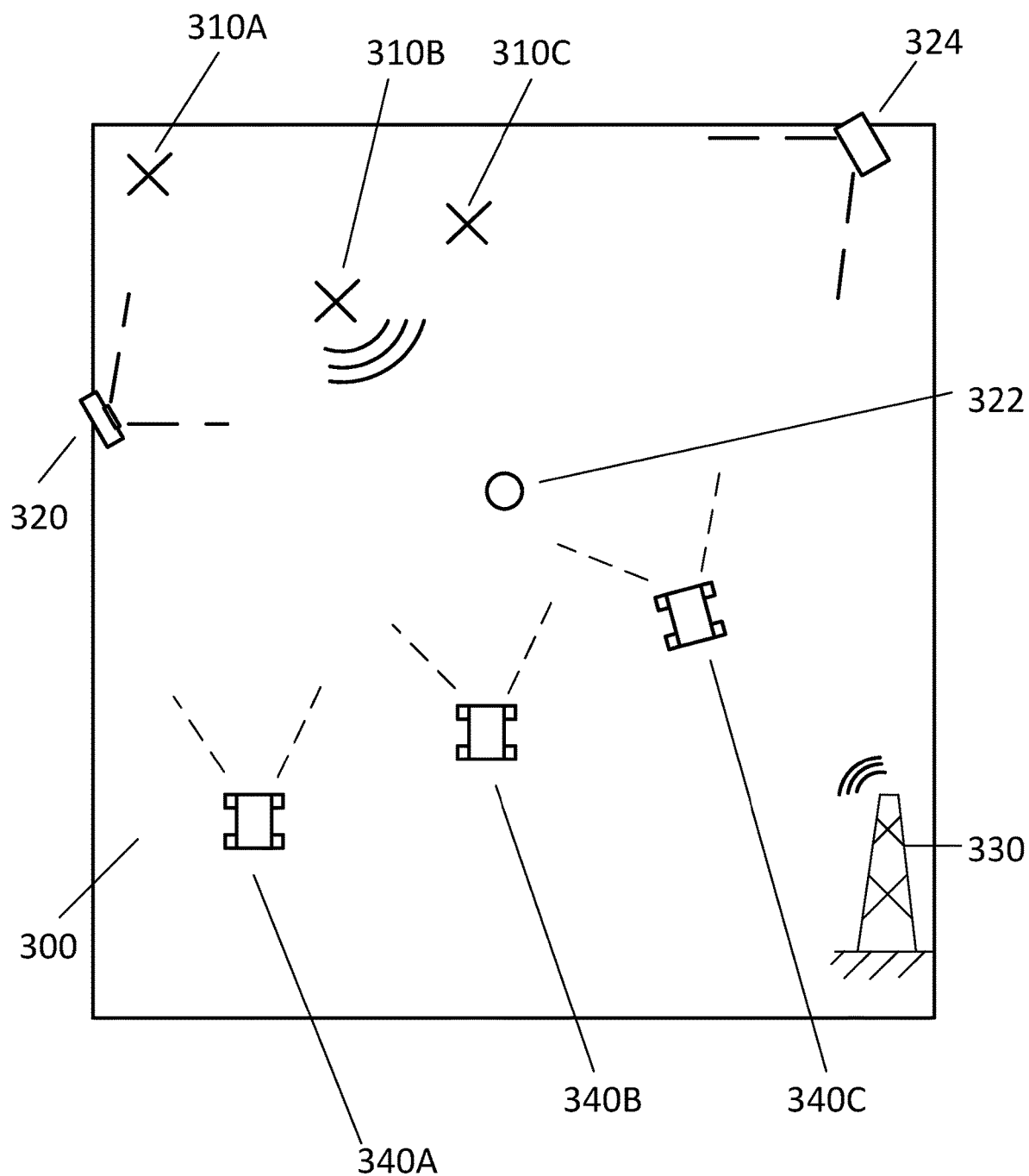
FIG. 5 illustrates an alternative exemplary mobile animal scaring robotic system, including a plurality of robotic units being deployed to scare a group of animals in a field, in accordance with the present disclosure.

FIG. 5 illustrates an alternative exemplary mobile animal scaring robotic system, including a plurality of robotic units being deployed to scare and/or herd a group of animals in a field. Field 300 is illustrated, where a camera sensor 320, an infrared sensor 324, and an audio sensor 322 are provided as infrastructure installed in the field. Similarly, LIDAR, radar, or other similar known sensor systems could be installed. Based upon sensor data provided through wired or wireless communication, base station 330 determines a location and likely species of nuisance animals 310A, 310B, and 310C, for example, potentially including feral hogs. Three robotic units 340A, 340B, and 340C are controlled upon the field, equipped with the location data of the nuisance animals and with visual or other sensor devices on-board the robotic units, and are illustrated maneuvering on the field to scare the nuisance animals away from the field. As the robotic units get closer to the nuisance animals, sensor data from each of the units can be shared through the base station with the other units or directly from unit to unit. Use of multiple robotic units in coordination as illustrated can be termed using a plurality of robotic units as a swarm or in a swarm scare process.

Figure 6:
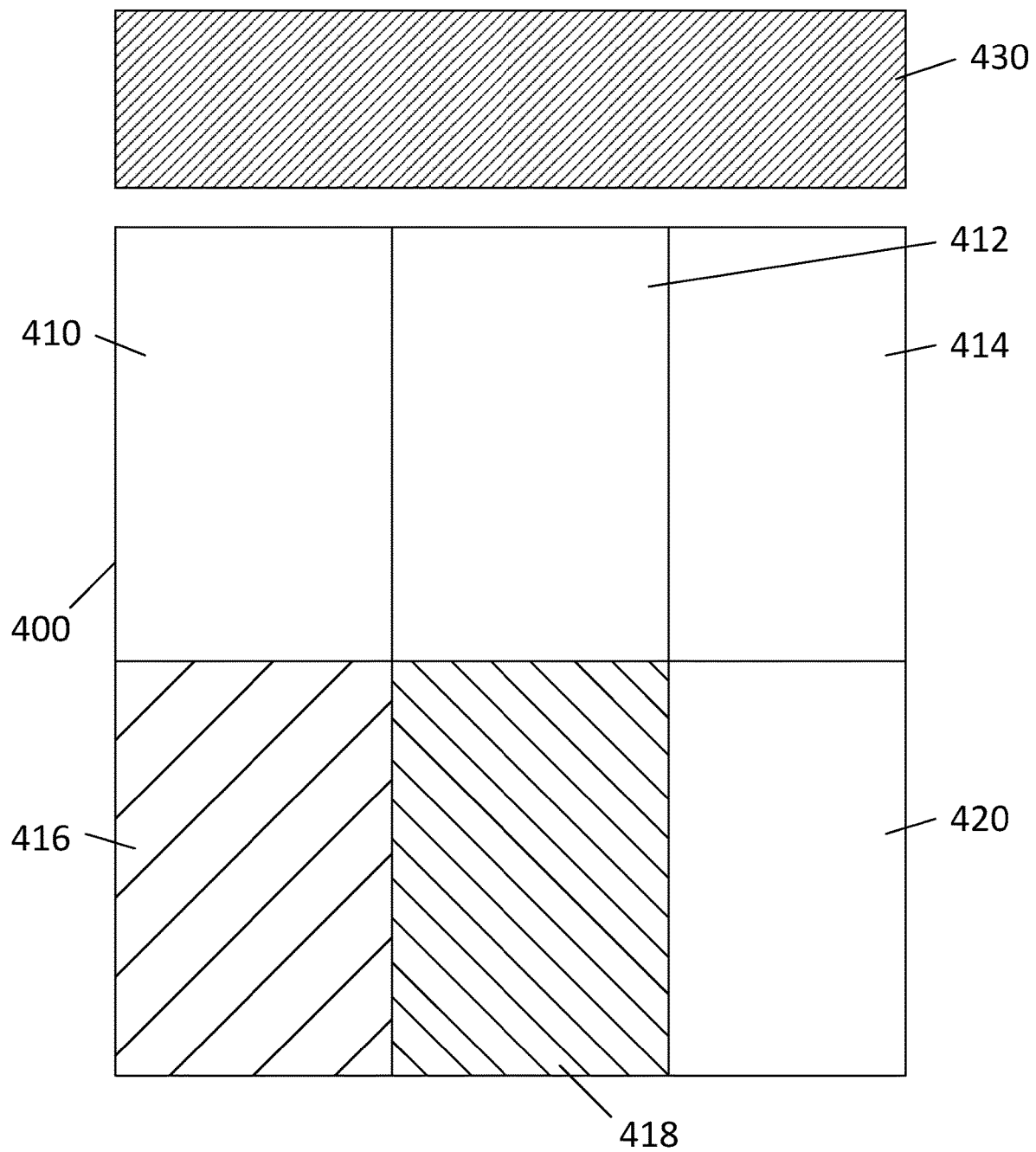
FIG. 6 illustrates a schematic representation of a plurality of fields within a patrol area, with priority given to particular fields due to crop status and with a proximate forest to the fields, in accordance with the present disclosure.

FIG. 6 illustrates a schematic representation of a plurality of fields within a patrol area, with priority given to particular fields due to crop status and with a proximate forest to the fields. Patrol area 400 is illustrated including fields 410, 412, 414, 416, 418, and 420. Such an illustration can be used upon a computerized terminal, for example, allowing an owner/user to label which fields are a priority to protect in a particular day. In another example, the illustration of FIG. 6 can simply be illustrative of code within the computerized process giving priority to a particular portion of a patrol area as a result of input priorities, and information about crops and livestock present in particular fields. Field 418 is identified as a highest or most important field to protect, for example, including vulnerable livestock or ripened crops. Field 416 is identified as a second highest priority field. Based upon these priorities, a mobile animal scaring robotic system according to the disclosure can plot patrol routes around and through the prioritized fields. Additionally, a location of nearby forest plot 430 is provided. This location can additionally be used to plot patrol routes, for example, based upon a prediction that deer tend to spend daylight hours in the forest and tend to wander in and out of the forest plot at dawn and dusk. Patrols can be plotted through fields 416 and 418 during normal hours, and they can be adjusted to patrol fields 410, 412, and 414 at dawn and dusk in an attempt to prevent the deer from migrating through those intervening fields. While FIG. 6 illustrates agricultural fields, it can be appreciated that any real estate property with, for example, expensive landscaping, golf course greens, an airport runway, etc. can similarly be plotted out and protected in portions as illustrated in FIG. 6.

Figure 7:
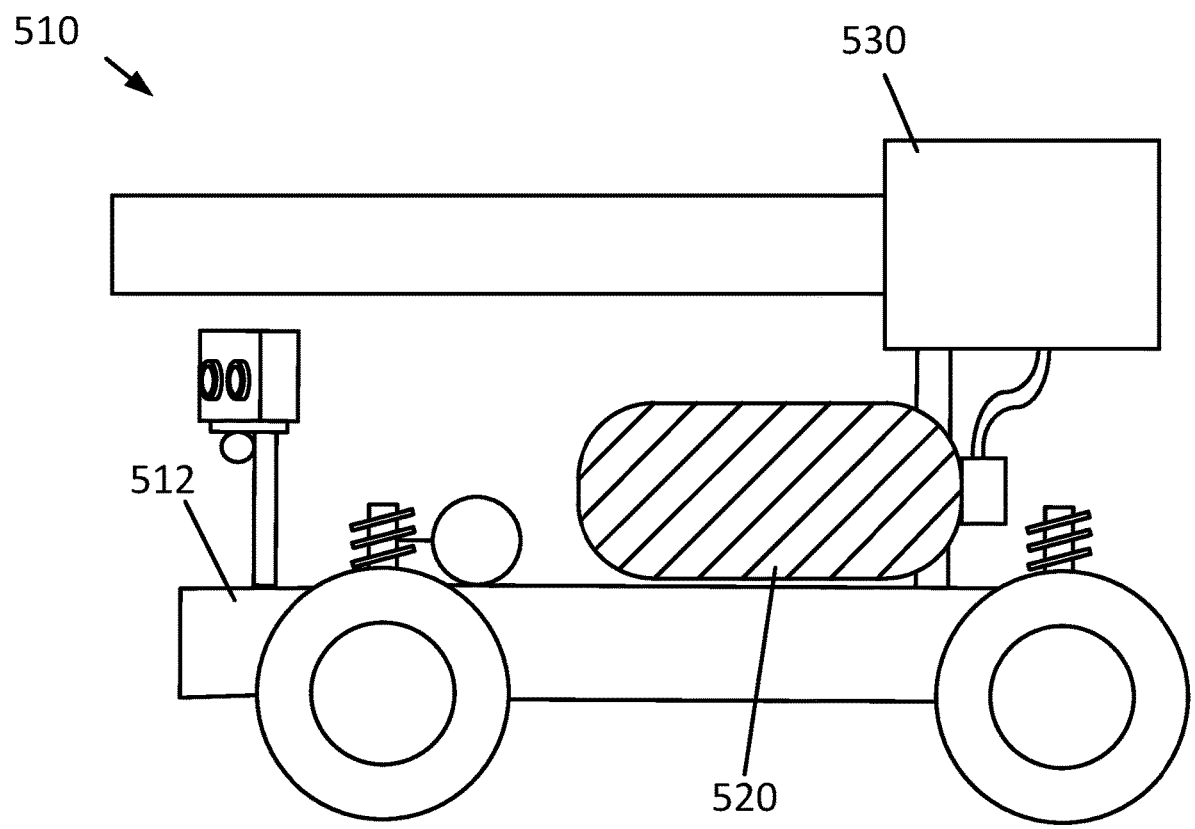
FIG. 7 illustrates an alternative exemplary mobile animal scaring robotic unit, including a propane fired noise cannon, in accordance with the present disclosure.

FIG. 7 illustrates an alternative exemplary mobile animal scaring robotic unit, including a propane fired noise cannon. Robotic unit 510 is similar to the hunter drone of FIG. 1, except that robotic unit 510 is illustrated with propane tank 520 and propane fired noise cannon 530 mounted to chassis 512. Such a propane cannon is known in the art and can be used to generate a significantly louder scare noise than an electrically powered audio speaker device.

Figure 8:
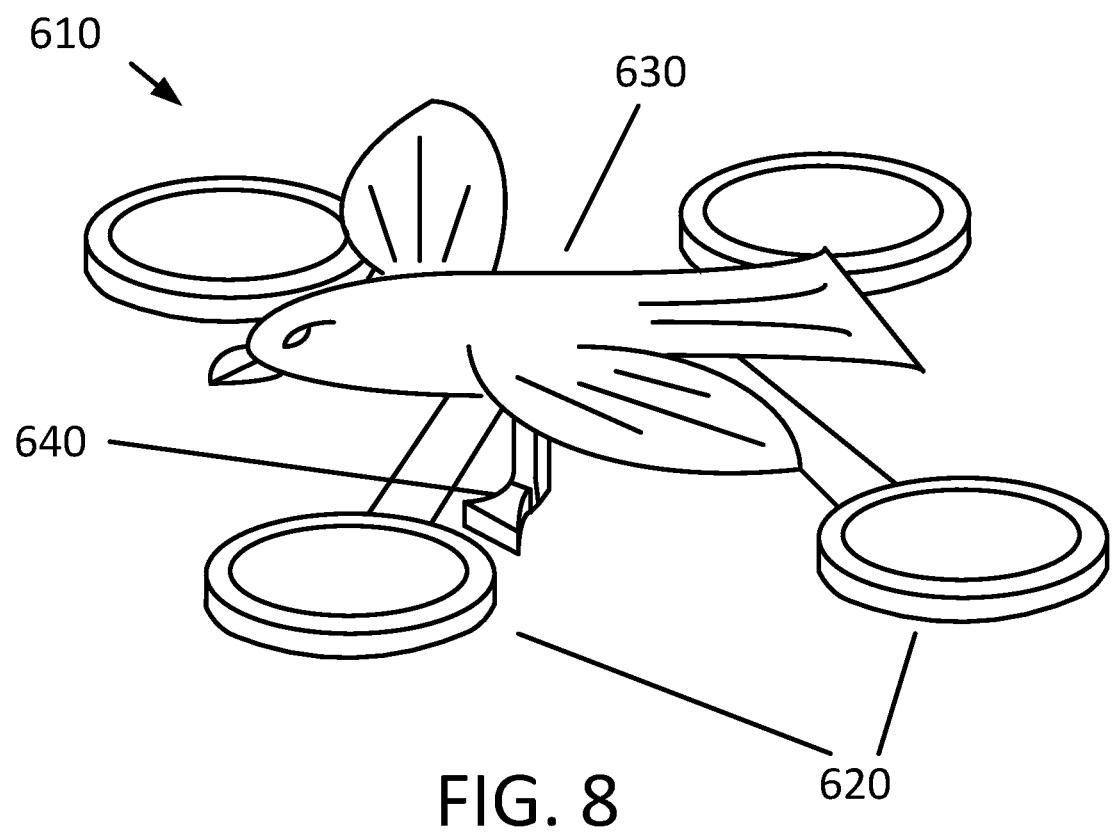
FIG. 8 illustrates an alternative exemplary mobile animal scaring robotic unit, including an aerial drone with an effigy of a hawk and an audio speaker system, in accordance with the present disclosure.

FIG. 8 illustrates an alternative exemplary mobile animal scaring robotic unit, including an aerial drone with an effigy of a hawk and an audio speaker system. Aerial drone 610 is illustrated including exemplary quad copter elements 620 enabling flight. Quad copter elements 620 are known in the art and are controlled through computerized control with on-board electronics. Additionally, hawk effigy 630 is provided, as well as audio speaker system 640. Through the visual presentation of hawk effigy 630 and the audio presentation of predator noises through speaker system 640, aerial drone 610 can patrol large areas, such as vineyards, scaring away nuisance animals that are afraid of aerial predators.

Figure 9:
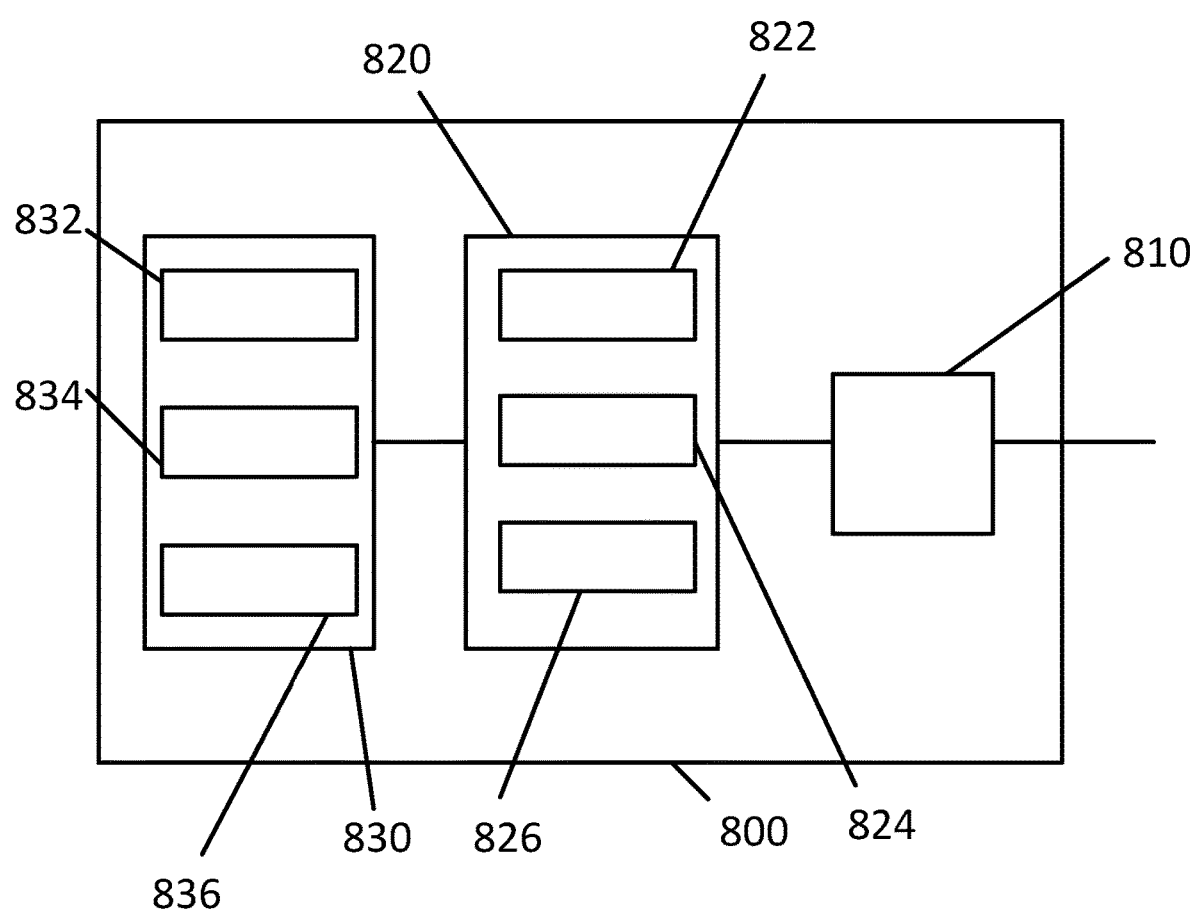
FIG. 9 illustrates an exemplary remote computerized device useful to coordinate sensor inputs and control of various mobile animal scaring robotic units, in accordance with the present disclosure.

FIG. 9 illustrates an exemplary remote computerized device useful to coordinate sensor inputs and control of various mobile animal scaring robotic units. Computerized device 800 is illustrated including communications device 810, computerized processor device 820, and durable memory device 830.

Communications device 810 is configured to manage incoming and outgoing data from device 800 and is configured to communicate over data networks, whether wired or wireless, for example, including direct communication with robotic units, charging units, sensor stations, etc.

Communications device 810 can further communication over the Internet or similar communications networks.

Processor device 820 includes a computerized processor and is configured to operate programmed code. In the exemplary embodiment of FIG. 9, device 820 includes three exemplary programming modules, with sensor coordination module 822 including programming configured to gather and process information from various sensors, robotic unit control module 824 useful to command or suggest locations or movements of various connected robotic units, and nuisance pursuit module 826 configured to coordinate efforts to move identified nuisance threats from one area to another area.

Durable memory device 830 includes hard drive or similar device useful to store information. Memory device 830 includes three exemplary libraries of data, including patrol area geography data 832, robotic unit data 834, and nuisance tracking and behavior library 836. Processor device 820 can store and access data from libraries 832, 834, and 836 to control and operate the disclosed processes herein. Device 800 and the various modules and libraries therein are exemplary, and the disclosure is not intended to be limited to the particular examples provided herein.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A system useful to protect a real estate property, comprising:
   at least one sensor configured to monitor presence of a nuisance animal on the real estate property;
   a computerized control module including programming to diagnose the presence of the nuisance animal based upon data from the at least one sensor; and
   at least one mobile robotic device, wherein the at least one mobile robotic device comprises at least one effigy of an animal, wherein the at least one effigy of the animal is tethered to the mobile robotic device, wherein the at least one mobile robotic device:
      moves the at least one effigy of the animal to a location of the nuisance animal on the real estate property and, while tethered to the mobile robotic device, elevates and lowers the at least one effigy of the animal relative to the mobile robotic device based upon the data from the at least one sensor; and
      emulates an animal predator to move the nuisance animal based at least upon the at least one mobile robotic device comprising the at least one effigy of the animal.

2. The system of claim 1, wherein the at least one mobile robotic device comprises wheels.

3. The system of claim 2, wherein the at least one mobile robotic device comprises four-wheel drive.

4. The system of claim 1, wherein the at least one mobile robotic device comprises a pair of caterpillar tracks.

5. The system of claim 1, wherein the at least one mobile robotic device comprises an aerial drone.

6. The system of claim 1, further comprising a plurality of mobile robotic devices configured to move in a coordinated way to herd the nuisance animal.

7. The system of claim 1, wherein the mobile robotic device comprises an effigy of a predator bird.

8. The system of claim 1, wherein the mobile robotic device comprises an effigy of a coyote.

9. The system of claim 1, wherein the mobile robotic device comprises an audio speaker generating noises.

10. The system of claim 1, wherein the mobile robotic device comprises a propane cannon generating noises.

11. The system of claim 1, wherein the mobile robotic device utilizes one of a camera device, a radar device, and a LIDAR device to move around the real estate property.

12. The system of claim 1, further comprising a plurality of camera devices deployed around the real estate property; and
    wherein the mobile robotic device utilizes data from the camera devices to move around the real estate property.

13. The system of claim 1, wherein the mobile robotic device utilizes one of global positioning data, cell phone tower data, and inertial data provided by a gyroscopic device to move around the real estate property.

14. The system of claim 1, wherein the computerized control module is located on the at least one mobile robotic device.

15. The system of claim 1, wherein the computerized control module further includes programming to:
    plot a patrol route for the at least one mobile robotic device around the real estate property.

16. The system of claim 15, wherein the computerized control module further includes programming to:
    prioritize a portion of the real estate property as vulnerable to the nuisance animal.

17. The system of claim 1, wherein the computerized control module further includes programming to:
    diagnose a species identity of the nuisance animal based upon the data from the at least one sensor; and
    wherein a species of the at least one effigy of the animal is based upon the species identity of the nuisance animal.

18. The system of claim 1, wherein the at least one sensor configured to monitor presence of the nuisance animal comprises one of a radar device, a camera device, an audio detection device, a weather sensor device, a moon phase sensor device, a motion detection device, a laser detection device, and a thermal imaging device.

19. A system useful to scare away nuisance animals from an area sensitive to the nuisance animals, comprising:
    at least one sensor configured to monitor presence of the nuisance animals in the area;
    at least one mobile robotic device configured to move to the area and scare the nuisance animals based at least upon the mobile robotic device being configured to emulate an animal predator based at least upon the mobile robotic device comprising at least one effigy of an animal tethered to the mobile robotic device; and
    a computerized base station configured to:
       monitor the at least one sensor;
       determine a threshold nuisance animal event based upon the monitored input; and
       control the mobile robotic device and, while tethered to the mobile robotic device, elevate and lower the at least one effigy of the animal relative to the mobile robotic device based upon the determined event.

* * * * *